United States Patent
Kim

(10) Patent No.: US 6,576,709 B2
(45) Date of Patent: Jun. 10, 2003

(54) POLYPROPYLENE IMPACT COPOLYMER HAVING BIMODAL SIZED RUBBER PARTICLES

(75) Inventor: Sehyun Kim, Murrysville, PA (US)

(73) Assignee: Sunoco, Inc. (R&M), Philadelphia, PA (US)

( * ) Notice: Subject to any disclaimer, the term of this patent is extended or adjusted under 35 U.S.C. 154(b) by 46 days.

(21) Appl. No.: 09/778,442

(22) Filed: Feb. 7, 2001

(65) Prior Publication Data

US 2002/0151654 A1 Oct. 17, 2002

(51) Int. Cl.⁷ .............. C08L 9/00; C08L 23/00; C08L 23/04
(52) U.S. Cl. ............... 525/191; 525/232; 525/240
(58) Field of Search ................................ 525/240, 232, 525/191

(56) References Cited

U.S. PATENT DOCUMENTS

| 4,916,186 | A | * | 4/1990 | Burk et al. ............ 525/71 |
| 5,498,671 | A | * | 3/1996 | Srinivasan ............ 525/193 |
| 6,288,167 | B1 | * | 9/2001 | Chen et al. ............ 525/71 |

* cited by examiner

*Primary Examiner*—Nathan M. Nutter
(74) *Attorney, Agent, or Firm*—Robert A. Koons, Jr.; Matthew P. McWilliams; Buchanan Ingersoll, P.C.

(57) ABSTRACT

Polypropylene impact copolymers and methods of making them are provided. These impact copolymers achieve a balance between stiffness and impact strength and additionally higher gloss by the inclusion therein of a bimodal distribution of rubber particles.

14 Claims, 6 Drawing Sheets

Atomic force micrographs of (a) Ti4040G (b) Ti4900M (c) Ti5900C

Effect of Ti4040G and/or Ti4900M in Ti5995 on impact properties

Effect of Ti4040G and/or Ti4900M in Ti5995 on the tensile yield stress and flexural modulus Effect of rubber particle size and ethylene content on surface gloss of molded part Effect of Ti4040G and/or Ti4900M in Ti5995 on surface gloss Effect of rubber particle size on Instrument impact (@4°C) and flexural modulus.

Effect of Ti4040G in Ti4900M

Effect of Ti4040G in Ti4900M

Effect of Ti4040G in Ti4900M and Ti5995

Effect of rubber particle size on Instrument impact (@4°C) and flexural modulus.

POLYPROPYLENE IMPACT COPOLYMER HAVING BIMODAL SIZED RUBBER PARTICLES

FIELD OF THE INVENTION

The present invention relates in general to impact copolymers and more specifically to a polypropylene having a bimodal rubber particle size distribution. The polypropylene impact copolymers of the present invention achieve a desirable balance between stiffness and impact strength.

BACKGROUND OF THE INVENTION

Those skilled in the art realize that rubber phase characteristics, such as rubber particle size, particle size distribution, particle morphology, rubber phase volume and degree of interfacial adhesion between rubber particles and matrix polymer significantly influence the properties of impact modified polymers. The optimization of these characteristics is critical in obtaining desirable polymer performance particularly in terms of impact strength, toughness, stiffness, and gloss.

Various efforts have been made to develop rubber-modified polymers having a balance between the properties of impact strength, stiffness and gloss since the introduction of rubber-modified thermoplastics. The concept of bimodal rubber particle size distribution was explored in styrene-containing polymers such as high impact polystyrene and acrylonitrile-butadiene-styrene ("ABS") in the early 1980's. It was demonstrated that a bimodal rubber particle size distribution in high impact polystyrene provides a stiffness-ductility balance while maintaining high gloss. This is accomplished by the presence of small amounts (typically 2–10%) of large sized (5–15 μm) rubber particles in small sized (0.2–1 μm) rubber particles. Such materials were developed to compete with costly ABS materials.

As a general rule in rubber-modified styrene-containing polymers at a given rubber concentration, the larger the rubber particles, the higher the impact properties, but the poorer the stiffness and gloss. Those higher impact properties were attributed to the more efficient use of rubber phase. The converse has been reported for impact modified polypropylene prepared via melt blending, i.e., the smaller the rubber particles, the higher the impact strength, above 0.5 μm, for a given rubber concentration. (See, B. Z. Jang et al., Poly. Eng. and Sci., 25, 643 (1985)). Because no craze formation was observed when the rubber particles were smaller than 0.5 μm, the materials had lower impact properties. Crazes are a large number of tiny voids formed in an attempt to release applied energy. The differences between rubber-modified styrene-containing polymers and melt blended polypropylene may be attributed to the existence and/or the amounts of inclusions within rubber particles as well as such fracture mechanisms as crazing and shear yielding. Effects of rubber concentration and particle size on notched Izod and brittle transition temperature of rubber modified polypropylene have been reported in A. van der Wal et al, Poly. Mater. Sci. Eng., 70, 189, (1993).

Therefore, a need exists in the art for an impact polypropylene copolymer with a bimodal rubber particle size distribution which will overcome the above-listed deficiencies.

The present invention provides an impact copolymer which exhibits a good balance between the properties of stiffness and impact strength.

SUMMARY OF THE INVENTION

The present invention provides a composition comprising at least about 80% of a first polypropylene having dispersed therein rubber particles of first size and a second polypropylene having dispersed therein rubber particles of a size greater than the first size.

The present invention further provides a composition comprising at least about 80% of a first polypropylene having dispersed therein rubber particles of a first size, a second polypropylene having dispersed therein rubber particles of a size greater than the first size and a third polypropylene having dispersed therein rubber particles of a size greater than the first size.

The present invention yet further provides a method of making an impact copolymer, the method comprising combining a first polypropylene having dispersed therein rubber particles of a first size and a second polypropylene having dispersed therein rubber particles of a size greater than the first size wherein the first polypropylene comprises at least about 80% of the impact copolymer.

The present invention still further provides a method of making an impact copolymer, the method comprising combining a first polypropylene having dispersed therein rubber particles of a first size with a second polypropylene having dispersed therein rubber particles of a size greater than the first size and with a third polypropylene having dispersed therein rubber particles of a size greater than the first size, wherein the first polypropylene comprises at least about 80% of the impact copolymer.

These and other advantages and benefits will be apparent from the Detailed Description of the Invention herein below.

BRIEF DESCRIPTION OF THE FIGURES

The present invention will now be described for purposes of illustration and not limitation in conjunction with the following figures, wherein.

DETAILED DESCRIPTION OF THE INVENTION

The present invention will now be described for the purposes of illustration and not limitation by the following examples.

The commercial impact copolymers used herein have the characteristics as given in Table I, where Ti5995 powder, which is the same powder as Ti5900C, was compounded with basic antioxidants as known in the art. The bimodal rubber particle size distributions have been prepared by melt blending two copolymers having different sizes of rubber particles.

TABLE I

Some Properties of Impact Copolymers

| Property | Ti5995 | Ti4900M | Ti4040G |
|---|---|---|---|
| % $C_2$ | 3.0 | 5.5 | 8.0 |
| % XS | 6.6 | 9.7 | |
| Rubber particle size[a] ($\mu$m) | 0.2–0.4 | 1–1.5 | 3–5 |

[a]estimated from atomic force micrograph.

The following tests were conducted: Differential Scanning Calorimetry (DSC); tensile properties of each copolymer were determined by ASTM D638; the flexural modulus was determined by ASTM D790; the Izod Impact was determined by ASTM D256; gloss was determined by ASTM D2457; and instrumented impact @ 4° C. was determined by ASTM D3763.

Figure 1:
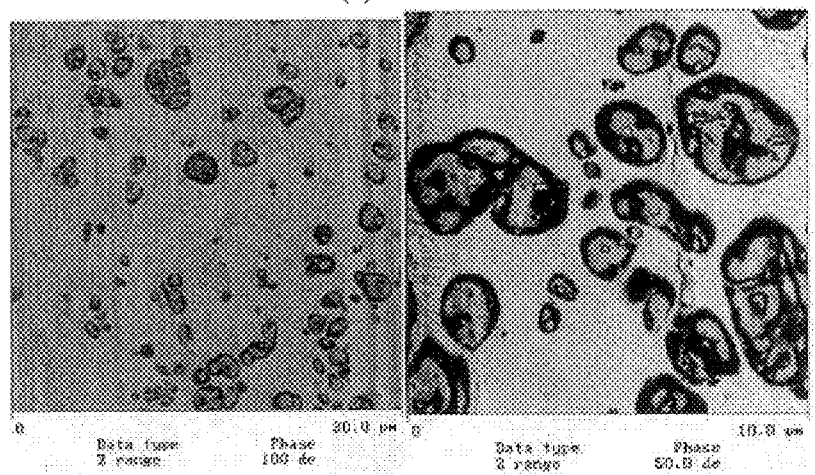
FIG. 1a is an atomic force micrograph of commercially produced impact copolymer Ti4040G.
FIG. 1b is an atomic force micrograph of commercially produced impact copolymer Ti4900M.
FIG. 1c is an atomic force micrograph of commercially produced impact copolymer Ti5995C.
Figure 1:
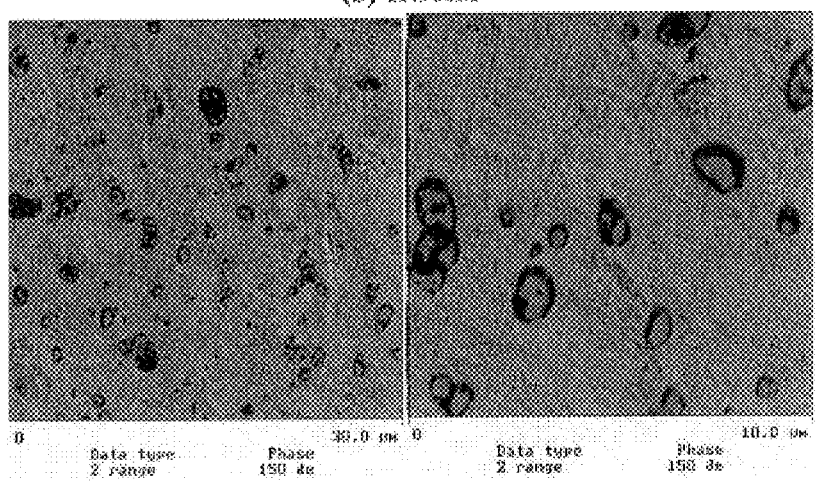
Figure 1:
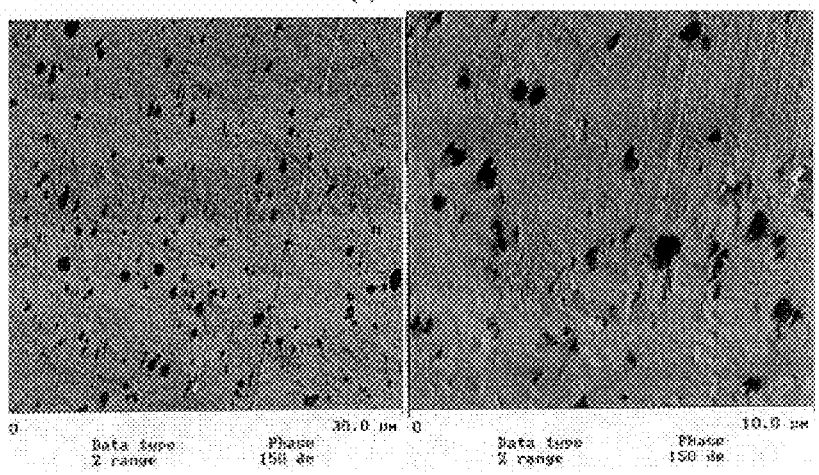

Aristech Chemical Corp. makes commercial impact copolymers having various rubber particle sizes as shown in the atomic force micrographs (AFM) FIGS. 1*a*, 1*b* and 1*c*. The rubber particle size of one of those impact copolymers herein designated "Ti5900C" and shown in FIG. 1*c* (base polypropylene powder is the same as Ti5995), was estimated from the micrograph to be about 0.2–0.4 $\mu$m The rubber particle size of another herein designated "Ti4900M", shown in FIG. 1*b* was estimated to be about 1–1.5 $\mu$m and that of a third herein designated as "Ti4040G", shown in FIG. 1*a*, was estimated to be about 3–5 $\mu$m. It should be noted that FIGS. 1*a*, 1*b*, and 1*c* are micrographs of each commercial impact copolymer at two different magnifications. To produce a blend with a bimodal rubber particle size distribution, small amounts of Ti4040G or Ti4900M were incorporated into Ti5995 by conventional methods practiced in the art such as but not limited to: melt blending and reactor blending via polymerization. The compositions and properties of impact copolymers and their blends are given in Table II.

As can be appreciated by reference to Table II, the rubber particle size depends on the rubber concentration of the impact copolymer, i.e. ethylene content. The melt flow rate (MFR) of the blend decreased with increasing amounts of Ti4040G in Ti5995, and the crystallinity of the blend decreased with increasing ethylene contents.

TABLE II

Various polymer blends of Ti5995 with Ti4040G and/or Ti4900M

| | Comp. Ex. 1 | Comp. Ex. 2 | Comp. Ex. 3 | Ex. 4 | Ex. 5 | Ex. 6 | Ex. 7 |
|---|---|---|---|---|---|---|---|
| Ti4040G | 100 | | | 10 | 20 | | 10 |
| Ti4900M | | 100 | | | | 20 | 10 |
| Ti5995 | | | 100 | 90 | 80 | 80 | 80 |
| MFR (grams/10 min) | 3.9 | 95 | 136 | 118 | 80 | 145 | 105 |
| % $C_2$ | 8.0 | 5.5 | 3.0 | 3.6 | 4.1 | 3.4 | 3.9 |
| $T_m$ (° C.) | 162.3 | 162.9 | 161.2 | 161.4 | 161.5 | 162.5 | 162.5 |
| $T_c$ (° C.) | 115.5 | 122.1 | 115.5 | 116.4 | 115.8 | 120.7 | 119.8 |
| $X_c$ (%) | 48.5 | 57.4 | 57.8 | 56 | 54.5 | 58.5 | 57.5 |
| Rubber particle size[a] ($\mu$m) | 3–5 | 1–1.5 | 0.2–0.4 | — | — | — | — |
| Tensile stress at yield (psi) | 3700 | 4094 | 4243 | 4318 | 4190 | 4364 | 4318 |
| Tensile Strain at yield (%) | 8.6 | 4.5 | 5.6 | 5.5 | 5.9 | 4.9 | 5.4 |
| Tensile Modulus (kpsi) | 185.2 | 252.0 | 237.6 | 243.4 | 233.0 | 256.4 | 245.1 |
| Flexural Modulus (kpsi) | 174.7 | 214.1 | 202.5 | 206.0 | 198.5 | 214.6 | 213.1 |
| Notched Izodn (ftlb/in) | 2.59 | 0.79 | 0.55 | 0.68 | 0.78 | 0.56 | 0.73 |
| 20° Gloss | 67.6 | 74.7 | 77.8 | 77.3 | 79.9 | 78.7 | 78.4 |
| 60° Gloss | 81.8 | 83.9 | 87.9 | 88.6 | 88.8 | 88.1 | 88.3 |
| Instrumented Impact @ 4° C. (ft-lb) | 32.6 | 2.9 | 0.7 | 1.6 | 1.7 | 1.2 | 1.7 |

[a]estimated from atomic force micrograph.

Figure 2:
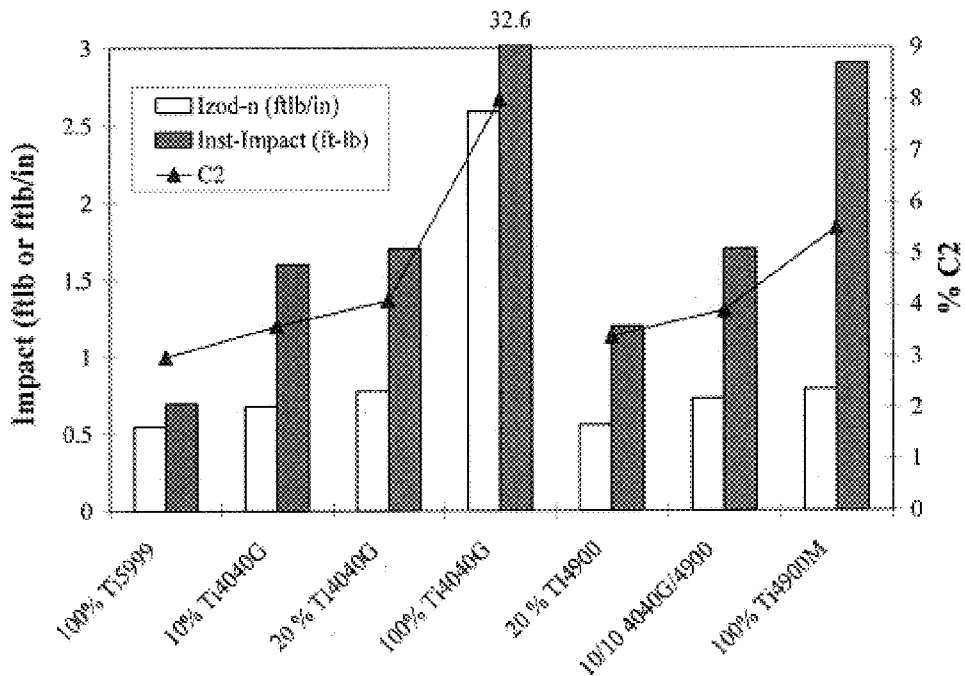
FIG. 2 illustrates the effect on impact properties of the addition of either Ti4040G or Ti4900M to Ti5995.

The ethylene contents of the blends increase with the addition of impact copolymers having larger rubber particles such as TI4040G and TI4900M, thus increasing impact properties of the blends as shown in FIG. 2.

Figure 3:
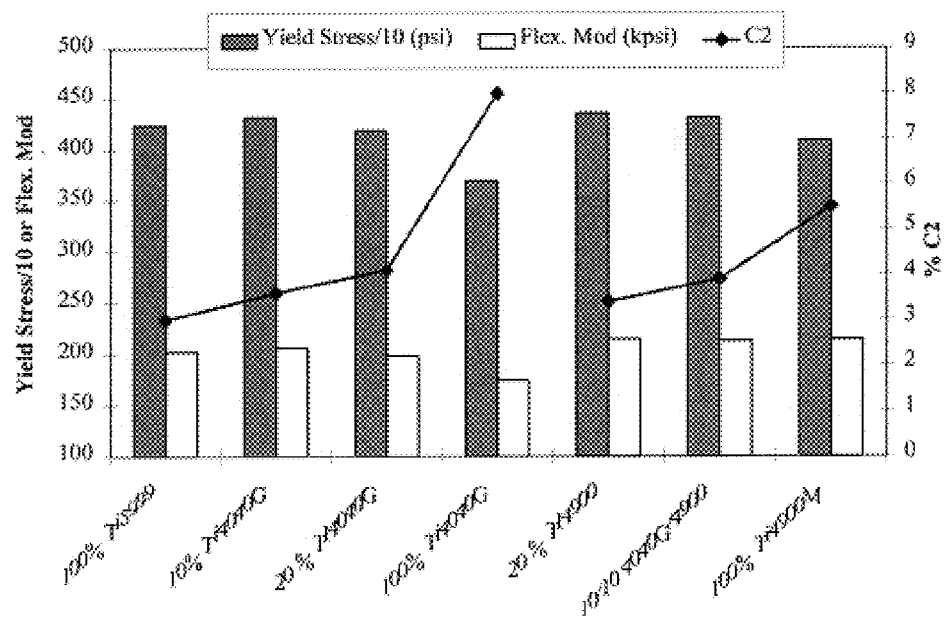
FIG. 3 demonstrates the effect on flexural modulus of the addition of either Ti4040G or Ti4900M to Ti5995.
Figure 4:
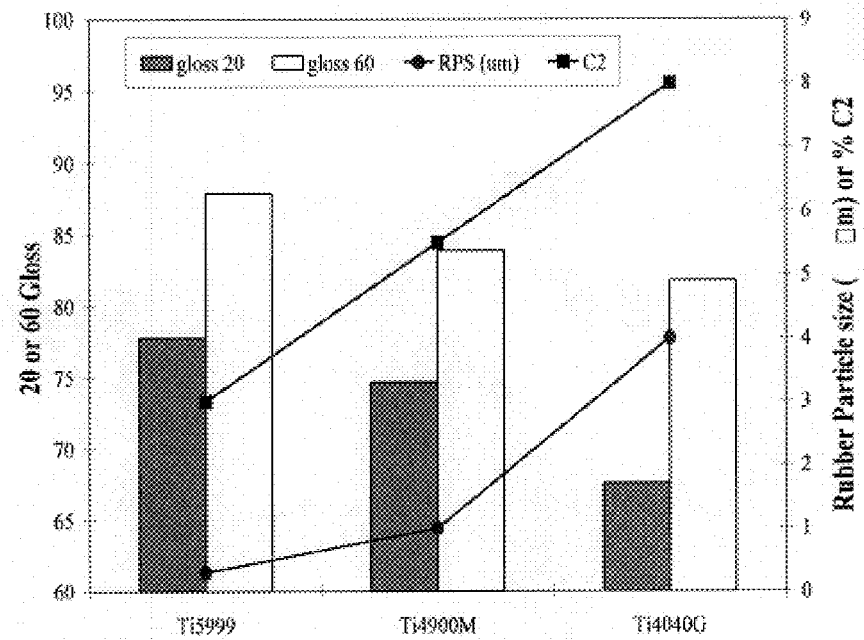
FIG. 4 illustrates the effect on surface gloss of rubber particle size and ethylene content.
Figure 5:
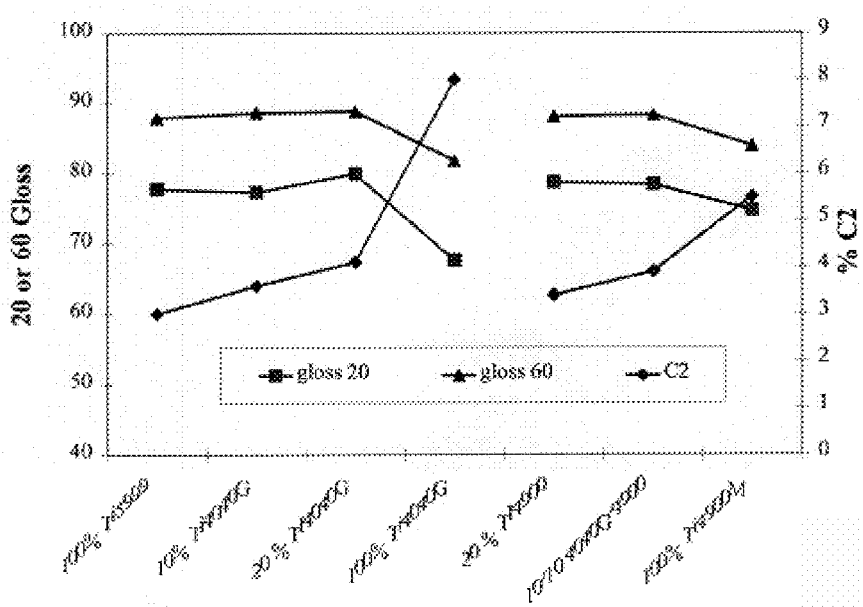
FIG. 5 demonstrates the effect on surface gloss of Ti4040G and/or Ti4900M in Ti5995.

The addition of 10–20% Ti4040G to Ti5995 (Examples 3 and 4) slightly improved the tensile yield stress and flexural modulus as shown in FIG. 3. The addition of 10–20% Ti4900M to Ti5995 (Examples 5 and 6) increased flexural modulus. It is interesting to note that the flexural moduli of the compounds containing Ti4900M are the same as that of Ti4900M alone. The surface gloss decreased with increasing size of rubber particle or ethylene content as is shown in FIG. 4. The addition of 10–20% Ti4040G (Examples 3 and 4) or Ti4900M (Example 6) did not affect the surface gloss of the blends, although the ethylene content increased as shown in FIG. 5.

Figure 6:
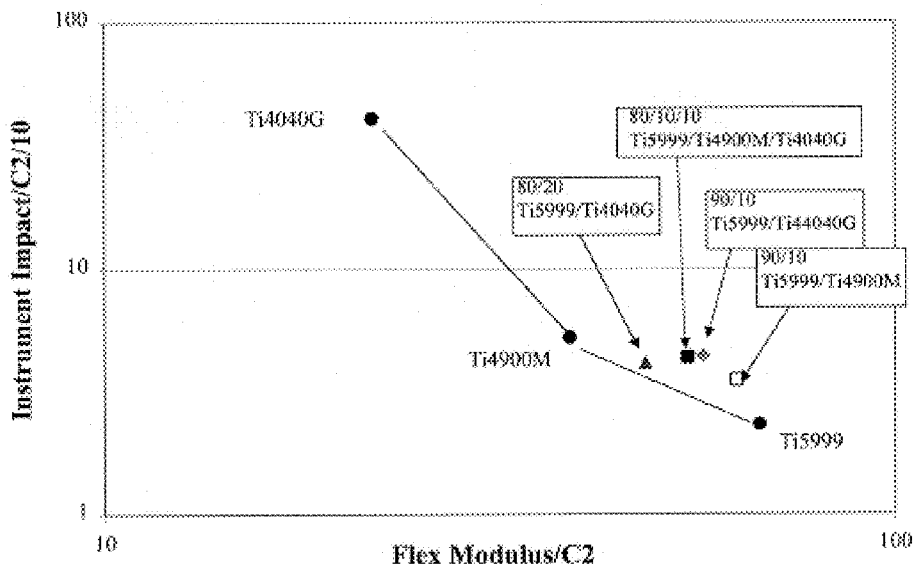
FIG. 6 illustrates the effect on instrument impact and flexural modulus of rubber particle size.

In order to demonstrate the effect of Ti4040G in Ti5995 in more detail, the impact properties and flexural moduli were normalized with the ethylene content of the compound and this relationship is depicted in FIG. 6. As shown in FIG. 6, Ti4040G alone has low modulus and high impact whereas Ti5995 has high modulus and low impact. By adding small amounts of Ti4040G to Ti5995, a better impact property-modulus balance, i.e., higher impact for given flex modulus or higher modulus for given impact, can preferably be obtained. In summary, the addition of small amounts of large rubber particles (3–5 µm or 1–1.5 µm) to small rubber particles (0.2–0.4 µm) provides a better property balance between impact and stiffness. The addition of 10–20% Ti4040G to Ti5995 increased the instrument impact at 4° C. from 0.7 to 1.7 ft-lb while maintaining flexural modulus at 200 kpsi and surface gloss at 80/90 (20/60° C. gloss). The addition of 10–20% Ti4040M to Ti5995 increased both flexural modulus and instrument impact at 4° C. Without being limited to any specific theory, the inventor believes that these results are the manifestation of synergistic effect of bimodal rubber particle size distribution in impact polypropylene. This synergistic effect of a bimodal rubber particle distribution, which is known to those skilled in the art to exist in styrene-containing polymers, i.e., glass polymers, also appears to exist in impact polypropylene, i.e., a semi-crystalline polymer.

Figure 7:
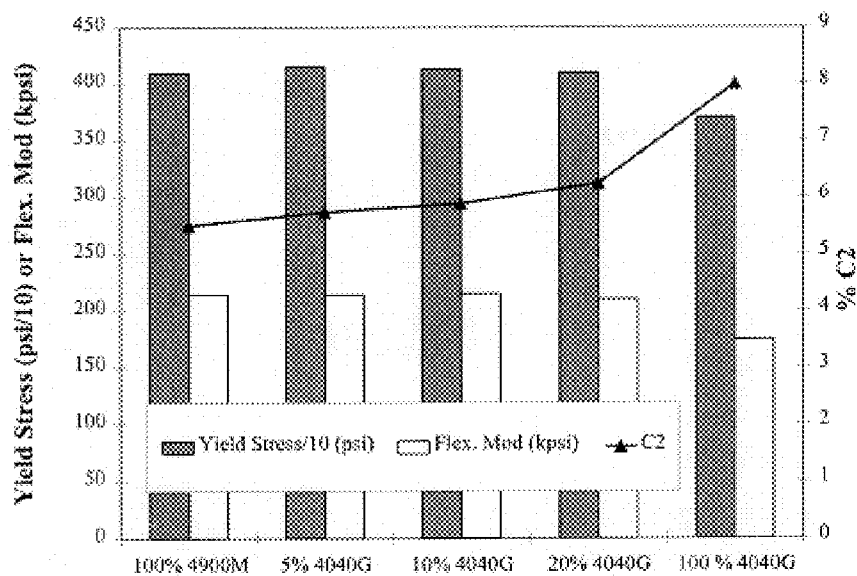
FIG. 7 illustrates the effect on instrument impact and flexural modulus of Ti4040G in Ti4900M.
Figure 8:
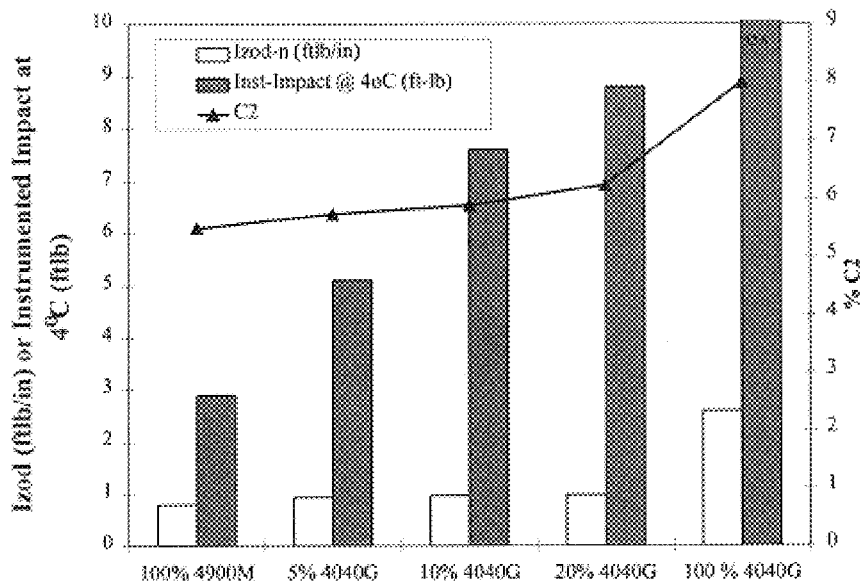
FIG. 8 demonstrates the effect on Izod-n of Ti4040G in Ti4900M and Ti5995.
Figure 9:
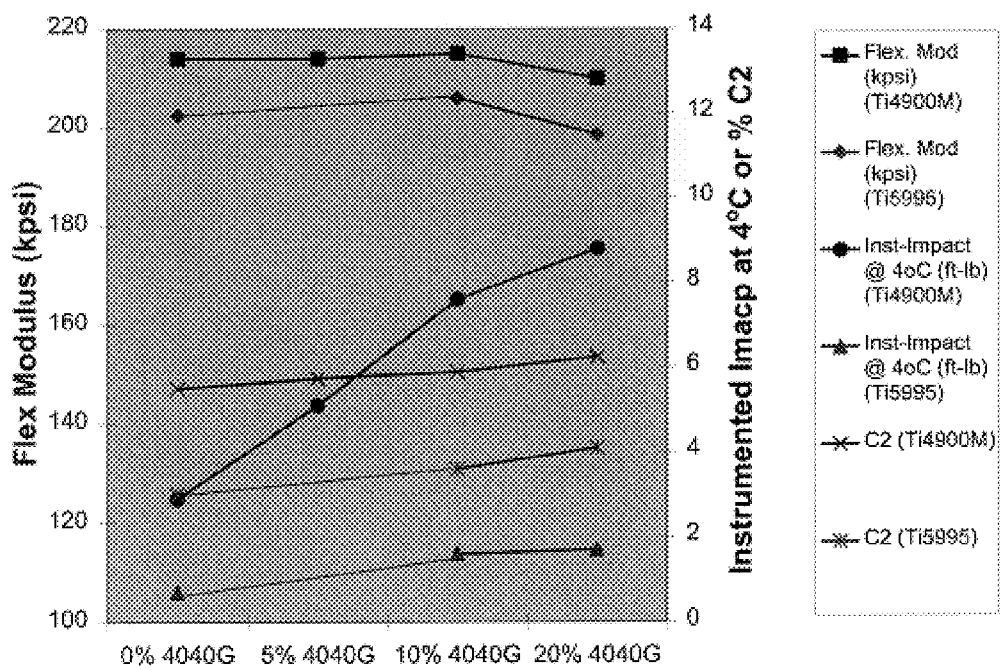
FIG. 9 demonstrates the effect of Ti4040G in Ti4900M and Ti5995.

To further elucidate the structure-property relationship of bimodal rubber particle size distribution on the properties of impact copolymers, Ti 4040G (3–5 µm) was added to Ti4900M which has larger rubber particles than Ti5995 (1–1.5 µm vs. 0.2–0.4 µm). The effects of the presence of large rubber particles in small rubber particles on impact properties, flexural for the molded parts were assessed and are reported in Table III. As shown in FIGS. 7 to 9, the flexural modulus of the matrix material, Ti4900M was maintained at 210 kpsi and the instrumented impact at 4° C. increased from 2.9 ft.lb to 8.8 ft.lb by the addition of 20% Ti4040G. As can be appreciated by reference to Table III, the MFR of the melt blend decreased with increasing amounts of Ti4040G in Ti4900M. The crystallinity of the blend decreased with increasing ethylene contents.

TABLE III

Various polymer blends of Ti4900M with Ti4040G

|  | Comp. Ex. 8 | Comp. Ex. 9 | Ex. 10 | Ex. 11 | Ex. 12 |
| --- | --- | --- | --- | --- | --- |
| Ti4900M | 100 |  | 95 | 90 | 80 |
| Ti4040G |  | 100 | 5 | 10 | 20 |
| MFR (grams/10 min) | 95 | 3.9 | 82 | 70 | 50 |
| % C₂ | 5.5 | 8.0 | 5.74 | 5.89 | 6.24 |
| Tₘ (° C.) | 1–1.5 | 3–5 |  |  |  |
| T_c(° C.) | 162.9 | 162.3 | 163.4 | 163.4 | 163.5 |
| X_c(%) | 122.1 | 115.5 | 122.3 | 122.2 | 121.9 |
| Rubber particle sizeᵃ (µm) | 57.4 | 48.5 | 56.5 | 56.1 | 55.9 |
| Tensile stress at yield (psi) | 4094 | 3700 | 4151 | 4130 | 4094 |
| Tensile Strain at yield (%) | 4.5 | 8.6 | 4.4 | 4.5 | 4.9 |
| Tensile Modulus (kpsi) | 252.0 | 185.2 | 288 | 287 | 277 |
| Flexural Modulus (kpsi) | 214.1 | 174.7 | 214 | 215 | 210 |
| Notched Izodn (ftlb/in) | 0.79 | 2.59 | 0.93 | 0.96 | 0.97 |
| Inst-Impact @ 4° C. (ft-lb) | 2.9 | 32.6 | 5.1 | 7.6 | 8.8 |

Figure 10:
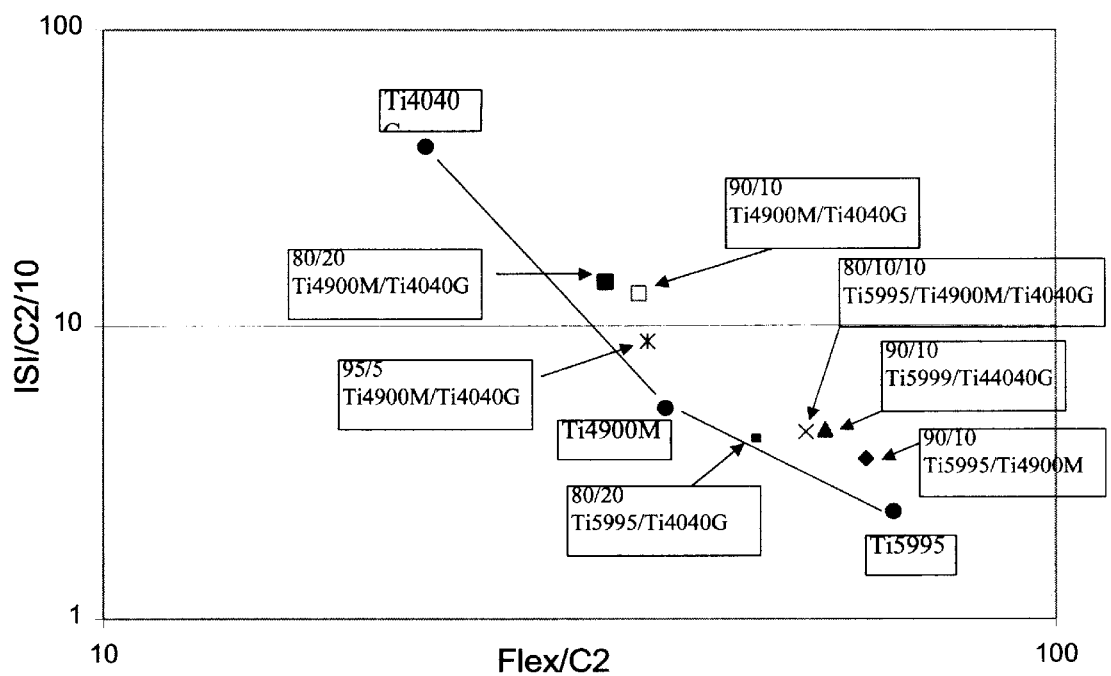
FIG. 10 compares the effect on instrument impact and flexural modulus of rubber particle size and Ti4040G or Ti4900M in Ti5995.

The impact properties and flexural modulus were normalized with the ethylene content of the compound and this relationship is depicted in FIG. 10. It should be noted that the values given in FIG. 10 are per unit ethylene content. As shown in FIG. 10, Ti4040G has low modulus and high impact while Ti5995 has high modulus and low impact and Ti4900M has medium impact and modulus per unit ethylene. By adding small amounts of Ti4040G either to Ti4900M or to Ti5995, a better impact property-modulus balance, i.e., higher impact for given flex modulus can preferably be obtained. The results appear to indicate the presence of a synergistic effect of bimodal rubber particle size distribution in impact polypropylene. As can be seen with reference to FIG. 10, the improvement in instrumented impact was much higher for Ti4900M than for Ti5995. This was about 300% improvement over Ti4900M in comparison to 240% for Ti5995. Without being limited to any specific theory, the inventor believes that these results suggest that the size of the rubber particle of the matrix polymer plays an important role to the degree of improvement in impact properties.

As will be readily apparent to those skilled in the art upon review of the data and figures included herein, the addition of small amounts of large sized rubber particles to small rubber particles improved impact properties of the blended impact copolymer polypropylenes while maintaining stiffness of the matrix material. The difference between small and large rubber particles appears to be an important factor in controlling the properties of impact polypropylene having a bimodal distribution of rubber particles.

As demonstrated herein, it is possible to significantly improve the impact property of impact polypropylene while maintaining stiffness of the matrix material by using various combinations of rubber particles. Although impact copolymers having rubber particles larger than 3–5 µm are currently unavailable, the inventor contemplates the use in the present invention of copolymers having rubber particles larger than 3–5 µm.

The foregoing illustrations of embodiments of the present invention are offered for the purposes of illustration and not limitation. It will be readily apparent to those skilled in the art that the embodiments described herein may be modified or revised in various ways without departing from the spirit and scope of the invention. The scope of the invention is to be measured by the appended claims.

I claim:

1. A composition consisting essentially of:
   a blend of,
   at least about 80% of a first propylene/ethylene impact copolymer having a first ethylene content and having dispersed therein a first plurality of rubber particles of a first size; and
   a second propylene/ethylene impact copolymer having a second ethylene content, greater than said first ethylene content, and having dispersed therein a second plurality of rubber particles of a second size, said second size being greater than said first size;
   said blend displaying a rubber particle size distribution that is bimodal.

2. The composition of claim 1, wherein said rubber particles dispersed within said first propylene/ethylene impact copolymer are about 0.2 $\mu$m to about 0.4 $\mu$m and said rubber particles dispersed within said second propylene/ethylene impact copolymer are about 1 $\mu$m to about 5 $\mu$m.

3. The composition of claim 2, wherein said rubber particles dispersed within said second propylene/ethylene impact copolymer are about 1 $\mu$m to about 1.5 $\mu$m.

4. The composition of claim 2, wherein said rubber particles dispersed within said second propylene/ethylene impact copolymer are about 3 $\mu$m to about 5 $\mu$m.

5. The composition of claim 1, wherein said rubber particles dispersed within said first propylene/ethylene impact copolymer are about 1 $\mu$m to about 1.5 $\mu$m and said rubber particles dispersed within said second propylene/ethylene impact copolymer are about 3 $\mu$m to about 5 $\mu$m.

6. A method of making an impact copolymer, said method comprising:
   blending a first propylene/ethylene impact copolymer having a first ethylene content and having dispersed therein a first plurality of rubber particles of a first size; and a second propylene/ethylene impact copolymer having a second ethylene content, greater than said first ethylene content and having dispersed therein a second plurality of rubber particles of a second size, said second size being greater than said first size, wherein said first propylene/ethylene impact copolymer comprises at least about 80% of said impact copolymer.

7. The method of claim 6, wherein said rubber particles dispersed within said first propylene/ethylene impact copolymer are about 0.2 $\mu$m to about 0.4 $\mu$m and said rubber particles dispersed within said second propylene/ethylene impact copolymer are about 1 $\mu$m to about 5 $\mu$m.

8. The method of claim 7 wherein said rubber particles dispersed within said second propylene/ethylene impact copolymer are about 1 $\mu$m to about 1.5 $\mu$m.

9. The method of claim 7, wherein said rubber particles dispersed within said second propylene/ethylene impact copolymer are about 3 $\mu$m to about 5 $\mu$m.

10. The method of claim 6, wherein said rubber particles dispersed within said first propylene/ethylene impact copolymer are about 1 $\mu$m to about 1.5 $\mu$m and said rubber particles dispersed within said second propylene/ethylene impact copolymer are about 3 $\mu$m to about 5 $\mu$m.

11. The method of claim 6, wherein said step of combining is accomplished by melt blending.

12. The method of claim 6, wherein said step of combining is accomplished by polymerizing impact polypropylene having different rubber particle sizes in the polymerization reactor.

13. A composition consisting essentially of:
    a blend of,
    at least about 80% of a first propylene/ethylene impact copolymer having a first ethylene content and having dispersed therein a first plurality of rubber particles of a first size; and
    at least one other propylene/ethylene impact copolymer having an ethylene content different from said first ethylene content and having dispersed therein a plurality of rubber particles of a size greater than said first size.

14. A method of making an impact copolymer, said method comprising:
    blending a first propylene/ethylene impact copolymer having a first ethylene content and having dispersed therein a first plurality of rubber particles of a first size with at least one other propylene/ethylene impact copolymer having an ethylene content different from said first ethylene content and having dispersed therein a plurality of rubber particles of a size greater than said first size,
    wherein said first propylene/ethylene impact copolymer comprises at least about 80% of said impact copolymer.

* * * * *